Patented June 18, 1946

2,402,456

UNITED STATES PATENT OFFICE 2,402,456

CHEMICAL PROCESS

Frank K. Signaigo, Brandywine Hundred, Del., assignor to E. I. du Pont de Nemours & Company, Wilmington, Del., a corporation of Delaware No Drawing. Application March 7, 1944,
Serial No. 525,436

8 Claims. (Cl. 260—139)

This invention relates to methods for sulfiding normally gaseous olefins.

Organic sulfides have become of considerable industrial importance and methods for obtaining them from available raw materials are, therefore, of considerable utility.

Accordingly, this invention has as an object an economical and practicable process for producing organic sulfides from gaseous olefins. A further object is to provide a method for producing reducible sulfides from normally gaseous monoolefins and sulfur. A still further object is to provide methods for producing sulfides from ethylene and sulfur. A still further object is the preparation of bis-thioethers from gaseous monoolefins and sulfur. Additional objects will become apparent from an examination of the following description and claims.

These and other objects and advantages are accomplished by the herein described invention which broadly comprises heating under pressure sulfur and a normally gaseous monoolefin in the presence of an inert liquid vehicle at a temperature of at least 170° C., and thereafter recovering the desired product.

The following examples, in which proportions are given in parts by weight unless otherwise specified, are given for illustrative purposes and are not intended to place any restrictions or limitations on the herein described invention:

Example I

Fifty parts of powdered sulfur and 80 parts of benzene are charged into a steel autoclave which is pressured with ethylene to 1000 lbs. per sq. inch and agitated and heated at 175° C. for 6 hours. During this period the ethylene reacts with the sulfur as evidenced by the decrease in pressure, and additional ethylene is added from time to time to maintain the pressure within the reactor in the range of 1600 to 1800 lbs. per sq. in. The total pressure drop during the period of reaction amounts to 1200 lbs. per sq. in., which corresponds to the reaction of about 35 parts of ethylene. The reactor is cooled, and the reaction products which are completely dissolved in benzene are separated from the solvent by distillation. The reaction product is substantially free of hydrogen sulfide and thiols.

Information as to the character of the mixture of liquid products obtained as above is conveniently obtained by submitting the mixture to reducing conditions whereby the compounds containing sulfur-to-sulfur bonds are cleaved to thiols and the compounds containing simple sulfide links are unchanged. This is most conveniently accomplished by catalytic hydrogenation using a sulfactive catalyst. The hydrogenation is accomplished by charging the mixture of sulfides into a pressure reactor and heating it at 150° C. under hydrogen pressure of about 2000 lbs. per sq. inch for 3 to 6 hours in the presence of a cobalt trisulfide catalyst, prepared as described hereinafter. The products obtained in addition to hydrogen sulfide are:

| | Parts |
|---|---|
| Ethanethiol | 3 |
| Ethanedithiol | 10 |
| Ethylthioethanethiol | 18 |
| Diethylether of ethanedithiol | 8 |
| Higher boiling materials | 9 |

Of the above products only the last two could have been present in the original mixture. The structure of the precursors to the thiols formed have not been determined with certainty but they are believed to be low molecular weight alkyl sulfides containing the multiple sulfide group.

The above hydrogenation catalyst is prepared by precipitating a solution of cobalt chloride with an equivalent amount of aqueous sodium trisulfide, separating the precipitate by filtration, washing first with water and then with ethyl alcohol. The supernatant alcohol is removed by filtration and the residual alcohol is removed by heating under reduced pressure. The dried cobalt trisulfide is made into a paste with benzene to protect it from the air since it is pyrophoric.

Example II

Fifty parts of powdered sulfur are charged together with 80 parts of benzene into a steel autoclave and ethylene is introduced into the autoclave to a pressure of about 1000 lbs. per sq. inch. The autoclave is sealed, agitated, and heated to 175° C. The reaction proceeds rapidly as indicated by a decrease in total pressure and additional ethylene is added to maintain the pressure within the reactor in the range of 1400 to 1700 lbs. per sq. in. After two hours the total pressure drop amounts to about 500 lbs. per sq. inch, which corresponds to the reaction of about 15 parts of ethylene. At this point the reaction is interrupted by cooling the autoclave and finally releasing the excess ethylene. The reaction product is found to be completely dissolved in the benzene. Upon reduction by catalytic hydrogenation, there is obtained 15 parts of ethanedithiol, 8 parts of ethylthioethanethiol and 8 parts of higher boiling sulfides.

In a modification of the above process, the ratio of olefin to sulfur reacting is controlled as follows:

The autoclave containing sulfur and benzene is pressured with ethylene to 500 lbs. sq. inch at room temperature, sealed and heated at 175° C. for 4 hours. The pressure within the reactor rises to 750 lbs. per sq. inch and finally decreases to about 100 lbs. per sq. inch, which corresponds to the reaction of about 15 parts of ethylene. Upon hydrogenation of the reaction mixture there is obtained 20 parts of ethanedithiol, and 3 parts of higher boiling liquid products.

*Example III*

Fifty parts of sulfur and 100 parts of water are charged into a high-pressure steel autoclave and pressured with ethylene to about 1000 atms. The autoclave is then heated during 2 hours to 175° C. At this temperature, rapid reaction occurs and the heating is continued for 6 hours longer, additional ethylene being added to maintain the pressure within the reactor in the range of from 850 to 1000 atms. The reactor is then allowed to cool and the aqueous and oil layers are separated. The liquid, oily, product which amounts to 95 parts is subjected to vacuum distillation. There is obtained 10 parts of diethyl sulfide, 31 parts of the diethyl ether of ethanedithiol boiling at 73° C./5 mm., and 37 parts of a light brown oil of higher boiling point. The diethyl ether of ethanedithiol upon oxidation with 30% hydrogen peroxide in glacial acetic acid solution yields bis-ethylsulfonylethane melting at 139° C.

When the sulfurization reaction is carried out at the temperatures indicated in the table below in the presence of benzene and with an excess of ethylene, at a pressure of about 2000 lbs. per sq. inch, the amounts of the principal products obtained from 50 parts of sulfur are as follows:

| Reaction temperature | Diethyl sulfide | Diethyl ether of ethane-dithiol | Higher boiling sulfides |
|---|---|---|---|
| 200° C | 14 | 25 | 18 |
| 225° C | 40 | 27 | 22 |
| 250° C | 57 | 20 | 12 |

The conversion of other gaseous monoolefins is illustrated below:

Forty parts of sulfur and 60 parts of butene-2 are charged into a steel autoclave together with 80 parts of toluene. The autoclave is sealed, agitated, and heated at 200° C. for 6 hours. At the end of this period, the autoclave is cooled, opened, and 7 parts of cobalt trisulfide catalyst (prepared as described in Example I) are added and the reaction mixture is catalytically hydrogenated at 150° C. and 2500 lbs. per. sq. in. hydrogen pressure. Upon distillation of the reaction products the following are obtained:

| | Parts |
|---|---|
| Butanethiol | 29 |
| Butanedithiol-2,3 | 8 |
| Butylthiobutanethiol | 11 |
| Dibutyl ether of butanedithiol | 8 |
| Higher boiling products | 11 |

Similarly, 60 parts of isobutylene and 40 parts of sulfur, after reaction for 6 hours at 175° C. yield, after hydrogenation, isobutanethiol, isobutanedithiol, isobutylthioisobutanethiol and di-isobutyl ether of isobutanedithiol. Propylene is converted to sulfides and thiols in an entirely analogous manner.

The above examples serve to illustrate the principal features of this invention. The starting materials, the conditions of temperature, reaction time, etc., are, however, subject to considerable variation within the scope of the invention. In its broader aspects, the invention includes the production of sulfides by reacting a normally gaseous olefin with sulfur in the presence of an inert liquid vehicle at a temperature of at least 170° C.

In the practice of this invention there can be used any normaly gaseous olefin containing from 2 to 4 carbon atoms. This includes ethylene, propylene and the butylenes.

It is essential, in the practice of this invention, that the reaction should be effected at a temperature of at least 170° C. In general, the process of this invention is practiced at temperatures within the range of from 170° C. to 250° C. If the desired products are the reducible sulfides, then it is preferred to operate it at the lower temperatures, that is, at temperatures of the order of 175° C. When it is desired to obtain non-reducible sulfides, higher temperatures, of the order of from about 200° C. to 250° C., are employed to accelerate the rate of reaction.

As hereinbefore stated, the reaction of the present invention should be effected in the presence of an inert liquid vehicle. In general, it is desirable that said liquid should be a solvent for the reaction product, such as an inert hydrocarbon which may be either a paraffin or aromatic hydrocarbon. Water may also be used as the liquid vehicle to facilitate uniform heating of the reactants, especially in the case of the lower olefins that are to be heated to above their critical temperatures.

Generally, between about 0.5 to about 4 atomic equivalents of sulfur per mole of gaseous monoolefins are used. The lower ratios, of from about 0.5 to 1 atomic equivalent of sulfur per mole of gaseous monoolefin, are better adapted for the production of the non-reducible sulfides and the higher ratios, of the order of from about 2 to about 4 atomic equivalents of sulfur per mole of gaseous monoolefin, for the production of reducible sulfides.

The reaction is preferably carried out under pressure and this should be at least above 100 lb. per sq. inch to obtain a reasonably rapid rate of reaction. The upper pressure is generally determined by the limitations of the equipment or the vapor pressure of the reaction mixture under the conditions of the reaction.

By the process of this invention there may be had reducible and unreducible alkyl sulfides. By "reducible alkyl sulfides" are meant compounds containing sulfur-to-sulfur bonds, i. e., the multiple sulfide group. Said sulfides are converted to thiols when subjected to catalytic hydrogenation. On the other hand, unreducible alkyl sulfides contain simple sulfide linkages and are not affected when subjected to reducing conditions, e. g., to catalytic hydrogenation.

This invention is particularly useful for the preparation of bis-thioethers of normally gaseous monoolefins, e. g., diethylether of ethanedithiol, dibutyl ether of butanedithiol and diisobutyl ether of isobutanedithiol, since it produces these products in good yield in relatively pure form in a single operation.

As many apparently widely different embodiments of this invention may be made without departing from the spirit and scope thereof, it Having described the present invention, the following is claimed as new and useful:

1. The process for obtaining organic sulfides, which comprises heating sulfur and a normally gaseous monoolefin in the presence of an inert liquid vehicle under pressure at a temperature within the range of from 170° C. to 250° C., the number of carbon atoms in said monoolefin being a positive integer within the range of from 2 to 4.

2. The process according to claim 1 wherein the inert liquid vehicle is an inert hydrocarbon.

3. The process according to claim 1 wherein the inert liquid vehicle is water.

4. The process according to claim 1 wherein the monoolefin is ethylene.

5. The process according to claim 1 wherein the monoolefin is propylene.

6. The process according to claim 1 wherein the monoolefin is a butylene.

7. The process for obtaining reducible organic sulfides, which comprises heating sulfur and a normally gaseous monoolefin in the presence of an inert liquid vehicle at a temperature of about 175° C. under a pressure of more than 100 pounds per square inch, the ratio of sulfur to monoolefin being within the range of from about 2 to about 4 gram atoms of sulfur per mol of monoolefin, the number of carbon atoms in said monoolefin being a positive integer within the range of from 2 to 4.

8. The process for obtaining non-reducible organic sulfides, which comprises heating sulfur and a normally gaseous monoolefin in the presence of an inert liquid vehicle at a temperature within the range of from about 200° C. to 250° C. under a pressure of more than 100 pounds per square inch, the ratio of sulfur to monoolefin being within the range of from about 0.5 to 1 gram atom of sulfur per mol of monoolefin, the number of carbon atoms in said monoolefin being a positive integer within the range of from 2 to 4.

FRANK K. SIGNAIGO.